UNITED STATES PATENT OFFICE.

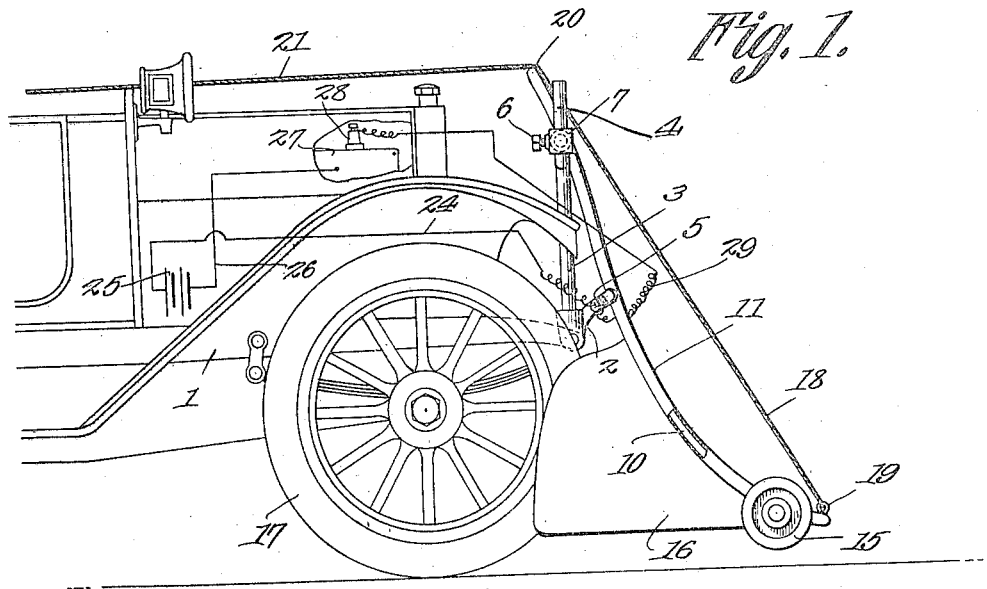

ODIN G. CLAY, OF WASHINGTON, DISTRICT OF COLUMBIA.

AUTO-FENDER.

1,106,783.    Specification of Letters Patent.    Patented Aug. 11, 1914.

Application filed June 26, 1913. Serial No. 775,968.

*To all whom it may concern:*

Be it known that I, ODIN GREENE CLAY, a citizen of the United States, residing at Washington, in the District of Columbia, have invented a new and useful Auto-Fender, of which the following is a specification.

The device forming the subject matter of this application is a fender adapted to be applied to a motor propelled vehicle.

One object of the invention is to provide a fender having means whereby, when the fender is struck by an obstacle, such as a person standing in the way of the fender, an electrical circuit will be opened, thereby stopping the advance of the vehicle.

Another object of the invention is to provide a fender of novel form, and to provide novel means for supporting the fender in place upon the vehicle.

With the above and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 shows in side elevation, a vehicle to which the fender constituting the subject matter of the present application has been applied; Fig. 2 is a front elevation of a vehicle equipped with the fender.

In the accompanying drawings, the numeral 1 indicates the chassis or some other accessible portion of the frame of a motor propelled vehicle. Secured to the chassis 1 adjacent the forward end thereof are sockets 2. Projecting from the sockets 2 are upwardly extended primary arms 3 including fingers 4. Secondary arms 5 project from the sockets.

Mounted upon the fingers 4 and held thereon by set screws 6 are sleeves 7 in which are journaled shafts 8 connected with collars 9 embracing the side portions of the frame 10. The sleeves 7 are adjustable upon the fingers 4, the collars 9 being fixed with respect to the side portions of the frame 10. The frame 10 may be fashioned from pipe and may be surrounded by a tubular rubber covering 11. Wires 12 or other flexible elements are extended in intersecting relation across the frame 10, the ends of the wires 12 being secured to the frame 10 by means of retractile helical springs 14. From the foregoing it is to be observed that the frame 10 of the fender is permitted to have an upward swinging movement on the shafts 8, the arms 5 engaging the fender frame below its point of suspension and serving to position the frame substantially as shown in Fig. 1. The arms 5 serve as a rest or support for the fender frame in its normal position.

At the lower end of the fender frame 10 are disposed relatively small ground engaging wheels 15. At its sides, the fender frame 10 is equipped with rearwardly extended wings 16. The function of these wings 16 is to prevent a portion of the body of a person caught by the fender, from slipping beneath the ground wheels 17 of the motor propelled vehicle. At times it is desirable to raise the fender out of the position shown in Fig. 1. In order to accomplish this result, a flexible element 18 is secured to the intermediate portion of the bottom of the fender as indicated at 19, the flexible element 18 passing over the upper end of the fender frame as shown at 20, and being extended rearwardly as indicated at 21 to a point within easy reach of the driver of the vehicle. Obviously, by drawing upon the flexible element 18, the fender frame 10 may be raised and swung rearwardly over the vehicle.

Located at the sides of the fender frame 10 are binding posts 22 upon which are journaled switch arms 23 of wire or other suitable conductor. The switch arms 23 are interengaged at their inner ends as shown at 24, after the manner of a plug switch. The switch arms 23 preferably are engaged with the intersecting wires 12. As shown in Fig. 2, the switch arms 23 are attached to certain of the wires 12 by means of tie-strands 23ª. From one binding post 22 a conductor 24 leads to a source of electrical energy 25. This source of electrical energy 25 may be a storage battery, a magneto, or any source of electrical energy constituting a portion of the mechanism of an electrically propelled vehicle. From the opposite side of the source 25 a conductor 26 leads to the engine 27. The spark plug of the engine is indicated at 28 and from the plug 28 a conductor 29 leads to the other binding post 22.

In practical operation, when a person is projected upon the fender, the resilient wires 12 of the fender will yield, and, at the same time, the interengaged parts 24 of the switch members 23 will be separated, thereby opening the circuit which includes the spark plug 28. Obviously, the engine 27 will at once cease to operate.

Having thus described the invention, what is claimed is:—

1. In a device of the class described, supports including angularly disposed primary and secondary arms; members mounted to slide for adjustment on the primary arms; means fixedly securing said members to the primary arms, and a fender pivoted to said members, the secondary arms engaging the fender to constitute a support therefor when the fender is in a normal position.

2. In a device of the class described, a vehicle frame; supports secured to the vehicle frame and provided with upwardly extended arms; a fender mounted to swing upon said arms; and other, relatively fixed arms projecting from the supports and engaged behind the fender to support the fender in a normal position.

3. In a device of the class described, a motor propelled vehicle including an electrical circuit constituting a part of the speed controlling mechanism of the vehicle; a fender carried by the vehicle, the fender including a frame and a flexible portion; a switch including coöperating members pivoted to the frame and extended across the flexible portion, said members being interposed in said circuit and coacting at their adjacent inner ends to open and to close said circuit.

In testimony that I claim the foregoing as my own, I have hereto affixed my signature in the presence of two witnesses.

ODIN G. CLAY.

Witnesses:
SELINA WILLSON,
I. E. SIMPSON.